(12) United States Patent  
Fuhrmann et al.

(10) Patent No.: US 8,165,350 B2  
(45) Date of Patent: Apr. 24, 2012

(54) ASSESSMENT OF A VIEW THROUGH THE OVERLAY OF MAPS

(75) Inventors: Oded Fuhrmann, Zichron Yaakov (IL); Dan Pelleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 11/945,283

(22) Filed: Nov. 27, 2007

(65) Prior Publication Data

US 2009/0136155 A1    May 28, 2009

(51) Int. Cl.
G06K 9/00    (2006.01)
G06K 9/46    (2006.01)
G06K 9/66    (2006.01)

(52) U.S. Cl. ......... 382/106; 382/154; 382/195; 345/419

(58) Field of Classification Search .................. 382/106, 382/154, 195; 345/419–427
See application file for complete search history.

(56) References Cited

U.S. PATENT DOCUMENTS

2003/0182052 A1    9/2003    DeLorme et al.

OTHER PUBLICATIONS

E. Shafer et al., "It Seems Possible to Quantify Scenic Beauty in Photographs" (*Source*: http://www.fs.fed.us/ne/newtown_square/publications/research_papers/pdfs/scanned/OCR/ne_rp162.pdf), 1970.

Ian Bishop et al., "Using image depth depth variables as predictors of visual quality", Journal: *Environment and Planning B: Planning and Design* 27(6) 865-875. Abstract only. Full article will be provided as soon as copy obtained, 2000.

Oleg Polonsky, "What's in an Image? Towards the computation of good views for three-dimensional objects" (*Source*: http://www.cs.technion.ac.il/users/wwwb/cgi-bin/tr-get.cgi/2006/MSC/MSC-2006-03.pdf), 2005.

N. Kalidindi et al., "Scenic Beauty Estimation of Forestry Images" (*Source*: http://www.ece.msstate.edu/research/isip/publications/reports/usfs_$_{imaging/1997/scenic}$_beauty_report_v2.pdf), 1997.

Thomas C. Brown et al., "Modeling Forest Scenic Beauty: Concepts and Application to Ponderosa Pine" (*Source*: http://www.fs.fed.us/rm/pubs_rm/rm_rp256.pdf), 1984.

A. Lothian, "Landscape quality assessment of South Australia". (*Source*: http://thesis.library.adelaide.edu.au/uploads/approved/adt-SUA20060615.142413/public/01front.pdf), 2000.

D. Gewirtzman, "Using the spatial openness metric for comparative evaluation of urban environments". Abstract only. Full article will be provided as soon as copy obtained, 2003.

*Primary Examiner* — Aaron W Carter

(74) *Attorney, Agent, or Firm* — Dan Swirsky

(57) ABSTRACT

A system for evaluating a view, including a first mapper for encoding an image of a view according to a first parameter to create a first map having multiple defined areas, a second mapper for encoding the image according to a second parameter to create a second map having multiple defined areas, an overlap mapper for combining the maps to create an overlap map, a tabulator for measuring areas in the overlap map corresponding to overlapping defined areas, creating a set of measurements of the image, and an analyzer for analyzing the set of measurements of the image and a learning set of measurement groups with associated values to compute an estimated value associated with the image where the estimated value relates to the set of measurements of the image in the same manner that each value in the learning set relates to its associated measurement group.

24 Claims, 6 Drawing Sheets

| Content | | | | |
|---|---|---|---|---|
| Distance (m) | Sky | Green Area | Buildings | Paved Area |
| <20 | | | | |
| 20 – 100 | | | | |
| 100 – 1000 | | | | |
| >1000 | | | | |

Fig. 3D

ASSESSMENT OF A VIEW THROUGH THE OVERLAY OF MAPS

FIELD OF THE INVENTION

The present invention relates to image analysis in general, and more particularly to evaluating the effect that a view has on the value of an asset.

BACKGROUND OF THE INVENTION

Scenic views or a lack thereof affect the value of assets such as real estate. However, as there are many factors contributing to the overall value of such assets, it is difficult to accurately assess the specific effect that a scenic view has on the value of an asset. In particular, as the value of scenic views is typically a subjective determination made by the owners and users of such assets, it can be difficult to objectively evaluate the value of an asset attributable to its scenic view in a market environment.

Current techniques used to assess the quality of a scenic view often involve guesswork and deliver inconsistent results. This can cause assets to be mispriced, and can lead to poorly planned projects that don't maximize their potential to provide the best possible scenic views. Having a consistent and standardized method to evaluate the effect that a scenic view has on an asset's value can lead to better estimates of an asset's value and can help maximize the potential value of new assets during the planning stage.

SUMMARY OF THE INVENTION

In one aspect of the present invention a system is provided for evaluating a view, the system including a first mapper configured to encode an image of a view according to a first parameter to create a first map including a plurality of defined areas, a second mapper configured to encode the image according to a second parameter to create a second map including a plurality of defined areas, an overlap mapper configured to combine the maps to create an overlap map, a tabulator configured to measure areas in the overlap map corresponding to overlapping ones of any of the defined areas, thereby creating a set of measurements of the image, and an analyzer configured to perform an analysis of the set of measurements of the image and a learning set of measurement groups with associated values to compute an estimated value associated with the image where the estimated value relates to the set of measurements of the image in the same manner that each value in the learning set relates to its associated measurement group.

In another aspect of the present invention the first parameter is a type of content in the image.

In another aspect of the present invention the second parameter is the relative distance of a type of content in the image from the point of view of the observer of the view.

In another aspect of the present invention the overlap mapper combines the first and second maps by superimposition.

In another aspect of the present invention the areas in the overlap map are measured in pixels.

In another aspect of the present invention the analysis is a regression analysis.

In another aspect of the present invention the computed estimated value associated with the image is used to price a real estate property.

In another aspect of the present invention the image is generated by computer aided design software.

In another aspect of the present invention the image is of a view of or from a virtual property in a computer-generated virtual world.

In another aspect of the present invention a method is provided for evaluating a view, the method including encoding an image of a view according to a first parameter to create a first map including a plurality of defined areas, encoding the image according to a second parameter to create a second map including a plurality of defined areas, combining the maps to create an overlap map, measuring areas in the overlap map corresponding to overlapping ones of any of the defined areas, thereby creating a set of measurements of the image, and performing an analysis of the set of measurements of the image and a learning set of measurement groups with associated values, thereby computing an estimated value associated with the image where the estimated value relates to the set of measurements of the image in the same manner that each value in the learning set relates to its associated measurement group.

In another aspect of the present invention the first encoding step includes encoding where the first parameter is a type of content in the image.

In another aspect of the present invention the second encoding step includes encoding where the second parameter is the relative distance of a type of content in the image from the point of view of the observer of the view.

In another aspect of the present invention the combining step includes combining the first and second maps by superimposition.

In another aspect of the present invention the measuring step includes measuring areas in the overlap map in pixels.

In another aspect of the present invention the performing an analysis step includes performing a regression analysis.

In another aspect of the present invention the performing an analysis step includes associating the estimated value with a real estate property.

In another aspect of the present invention the method further includes performing any of the steps where the image is generated by computer aided design software.

In another aspect of the present invention the method further includes performing any of the steps where the image is of a view of or from a virtual property in a computer-generated virtual world.

In another aspect of the present invention the method further includes performing any of the steps for a plurality of images of a plurality of views of or from a plurality of virtual property designs.

In another aspect of the present invention the method further includes calculating the value for the plurality of images in an environmental impact analysis.

In another aspect of the present invention the method further includes performing any of the steps for a plurality of images of a plurality of views from a plurality of locations along a route segment.

In another aspect of the present invention the method further includes summing a plurality of the values calculated for the plurality of images.

In another aspect of the present invention the method further includes summing a plurality of the values calculated for the plurality of images associated with a plurality of the route segments.

In another aspect of the present invention a computer program is provided embodied on a computer-readable medium, the computer program including a first code segment operative to encode an image of a view according to a first parameter to create a first map including a plurality of defined areas, a second code segment operative to encode the image according to a second parameter to create a second map including a plurality of defined areas, a third code segment operative to combine the maps to create an overlap map, a fourth code segment operative to measure areas in the overlap map corresponding to overlapping ones of any of the defined areas, thereby creating a set of measurements of the image, and a fifth code segment operative to perform an analysis of the set of measurements of the image and a learning set of measurement groups with associated values, thereby computing an estimated value associated with the image where the estimated value relates to the set of measurements of the image in the same manner that each value in the learning set relates to its associated measurement group.

BRIEF DESCRIPTION OF THE DRAWINGS

The present invention will be understood and appreciated more fully from the following detailed description taken in conjunction with the appended drawings in which:

FIG. 3D is a conceptual illustration of a table corresponding to the overlap map shown in FIG. 3C constructed and operative in accordance with an embodiment of the present invention.

DETAILED DESCRIPTION OF THE INVENTION

Figure 1:
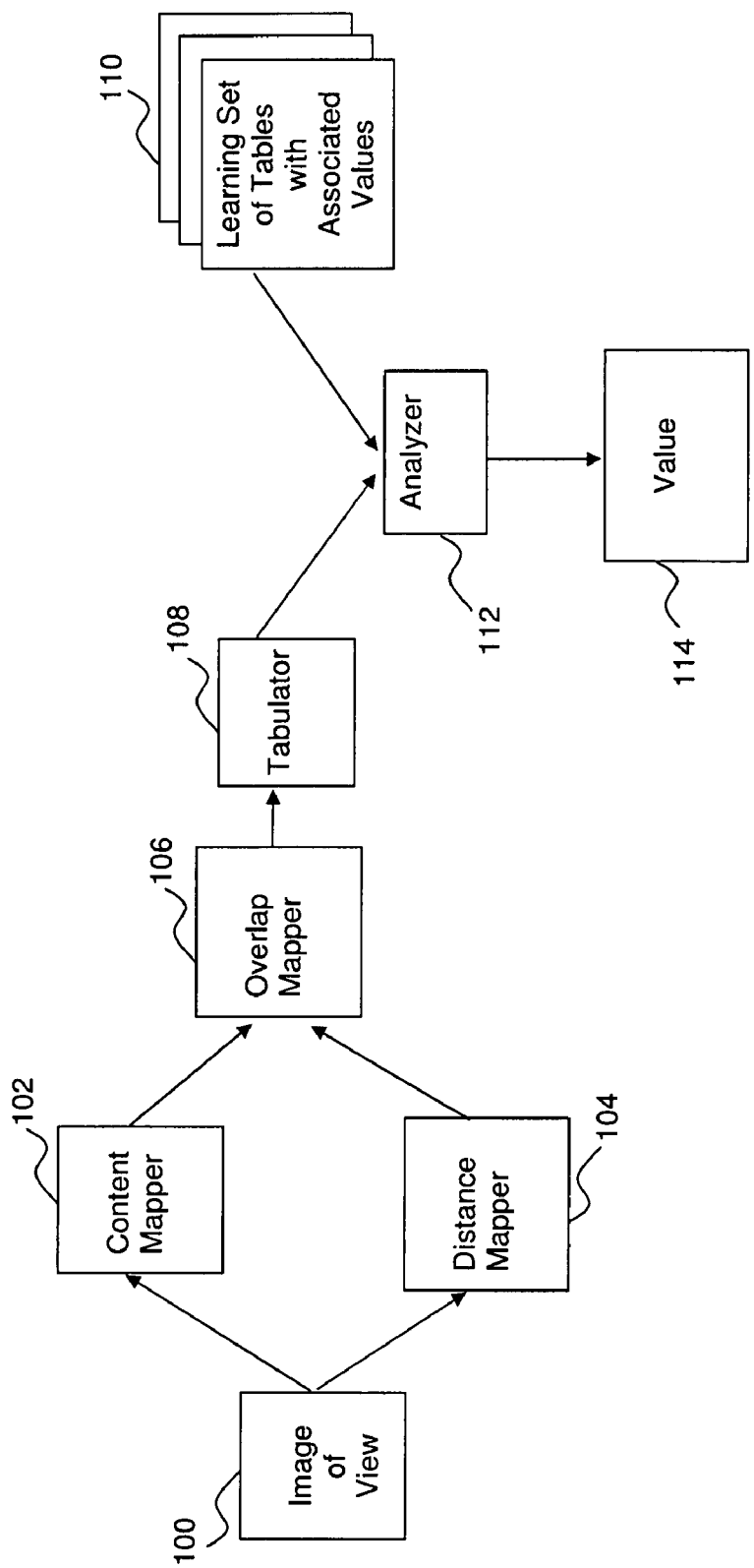
FIG. 1 is a simplified conceptual illustration of a view evaluation system, constructed and operative in accordance with an embodiment of the present invention.
Figure 2:
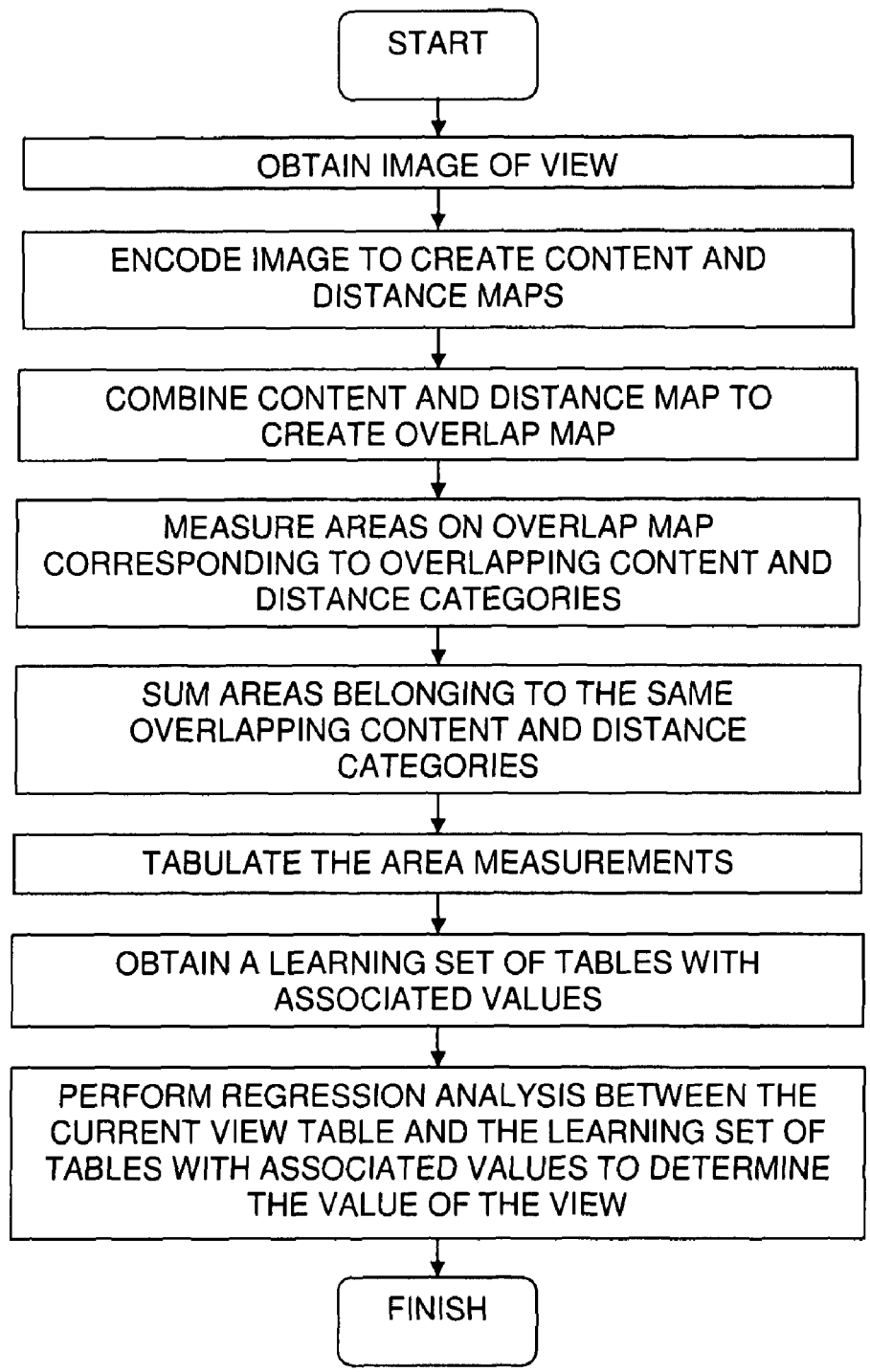
FIG. 2 is a simplified flowchart illustration of an exemplary method of operation of the system of FIG. 1, operative in accordance with an embodiment of the present invention.

Reference is now made to FIG. 1 which is a simplified conceptual illustration of a system for evaluating a view, constructed and operative in accordance with an embodiment of the present invention, and additionally to FIG. 2, which is a simplified flowchart illustration of an exemplary method of operation of the system of FIG. 1, operative in accordance with an embodiment of the present invention In the system of FIG. 1, at least one image 100 of a view, such as a photograph, is preferably encoded by a mapper 102 according to a parameter, such as the content of the view, to create a content map having one or more defined areas, with each area representing a specific type of content. Image 100 is preferably also encoded by a mapper 104 according to at least one additional parameter, such as defined areas of relative distance from the point of view of the observer, to create a distance map. The content map and distance map are then combined by an overlap mapper 106, such as by superimposition, to create an overlap map. Mappers 102, 104, and 106 may perform their functions using any known user-assisted or automated technique. The areas corresponding to overlapping content and distance categories on the overlap map are measured using any known quantifiable measurement, such as pixels, and are preferably tabulated by a tabulator 108 to form a group of measurements, such as table. A learning set 110 is then obtained of previously-collected groups of measurements, each group having an associated value. For example, data such as view images and historic prices may be collected on assets similar to the one being analyzed, where the images have been encoded and tabulated according to the method described above. An analyzer 110 performs an analysis, such as using the statistical methods of regression analysis, of the measurements of the current image and the learning set of measurements with associated values to compute an estimated value 114 associated with image 100 such that the estimated value relates to the measurements of the current image in the same manner that each value in the learning set relates to its associated measurements. The value may then be used, for example, to set a sale price of a real estate asset where the view is taken from the vantage point of the asset.

Figure 3A:
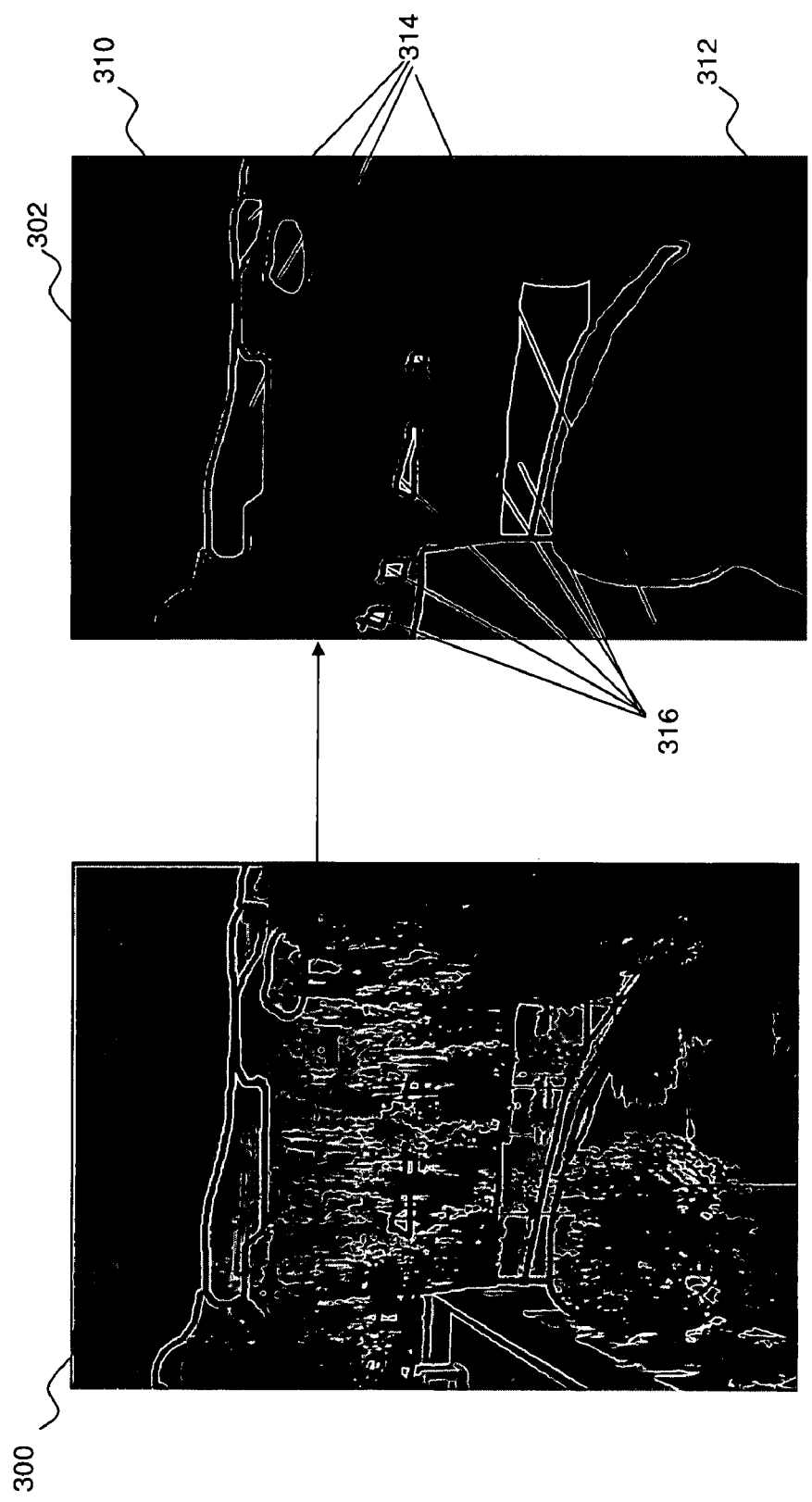
FIG. 3A is a conceptual illustration of encoding a content map constructed and operative in accordance with an embodiment of the present invention.
Figure 3B:
FIG. 3B is a conceptual illustration of encoding a distance map constructed and operative in accordance with an embodiment of the present invention.
Figure 3C:
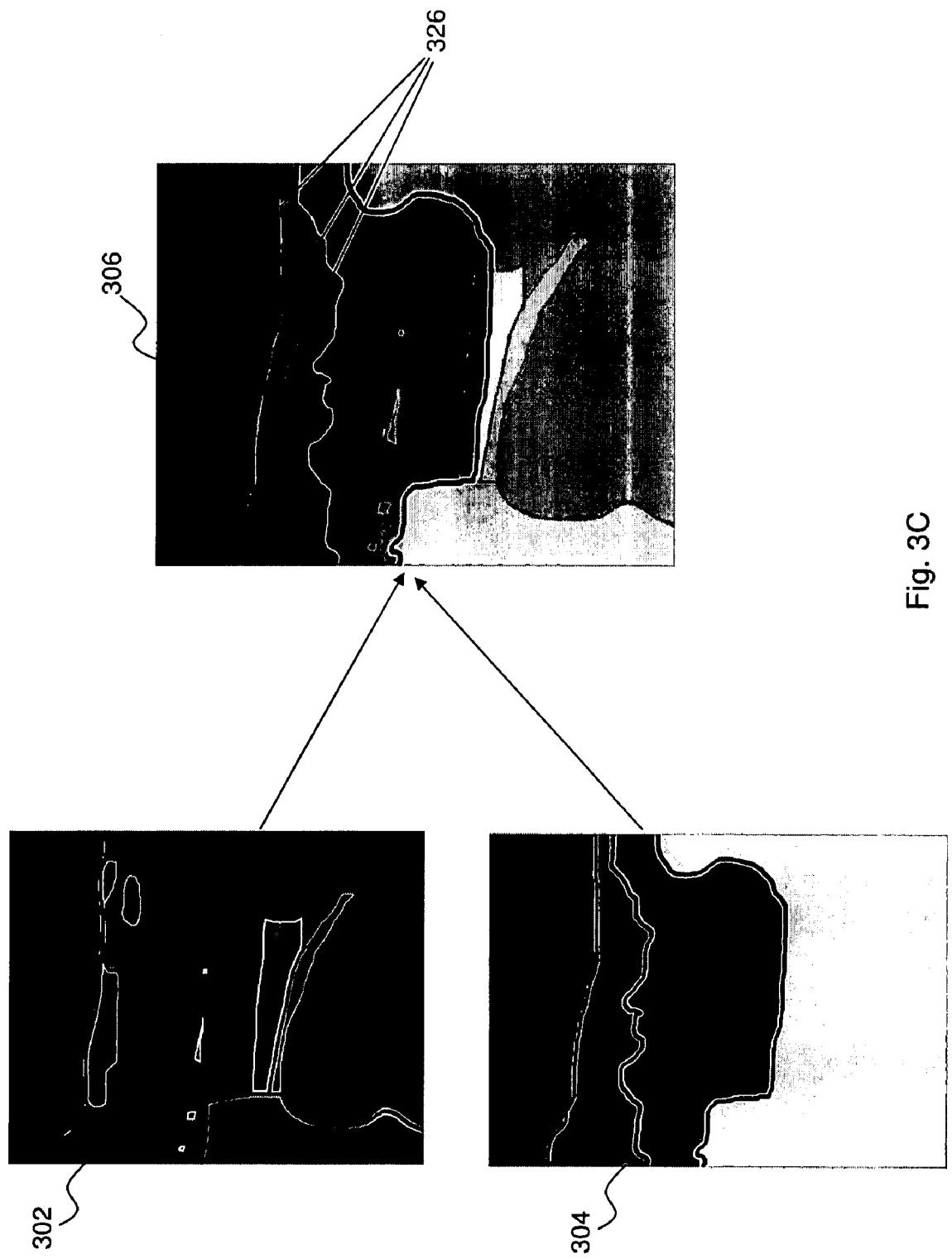
FIG. 3C is a conceptual illustration of encoding an overlap map constructed and operative in accordance with an embodiment of the present invention.

The system of FIG. 1 and method of FIG. 2 may be understood within the context of an exemplary scenario as shown in FIGS. 3A-3D. In FIG. 3A an image 300 of a scenic view is shown. Different content elements on image 300 are grouped into categories to create a content map 302. Such categories may include sky 310, green area 312, buildings 314, and paved area 316. In FIG. 3B areas on image 300 are grouped into categories of relative distance from the viewer to a create distance map 304. Examples of such categories may include areas 318 within a 20 m range from the viewer, areas 320 within a 20 m-100 m range from the viewer, areas 322 within a 100 m-1,000 m range from the viewer, and areas 324 situated more than 1,000 m from the viewer. In FIG. 3C, content map 302 and distance map 304 are superimposed to create an overlap map 306 where a different hue or shade of grey is used to define the areas for each overlapping content and distance category. Each grey area belonging to each overlapping content and distance category is measured, such as in pixels. Non-contiguous areas belonging to the same overlapping content and distance category may be summed to get the total area for each overlapping content and distance category. The total areas for each set of categories are tabulated in FIG. 3D to create a table 308 which is defined to have distance categories in rows, content categories in columns. For example, in FIG. 3C the set of areas 326 comprising buildings within a range of 100 to 1000 m may be measured and summed resulting in a pixel count. The pixel count, or a relevant measurement obtained by performing a set of predefined functions on the pixel count may be written to table 308 in FIG. 3D at the entry corresponding to row '100-1000 m' and column 'buildings'. All the grey areas on map 306 in FIG. 3C may be thus measured and tabulated in table 308 in FIG. 3D. The method described above may be repeated on a set of view images obtained for the purpose of creating a learning set with associated values. A statistical method such as regression analysis may be performed between table 308 and the learning set of tables to calculate a value corresponding to image 300.

The system of FIG. 1 and method of FIG. 2 may be employed in various contexts. For example, in a conventional real estate market the effect of a view seen from a selected property on the property's price may be evaluated by analyzing an image of the view. The view may be captured using any known technique, such as by photographing the view from the selected property, or by using tools such as MS virtual Earth, or Google Earth. Using the technique described in the system of FIG. 1 and method of FIG. 2, content, distance, and overlap maps may be created from the image of the view, and a corresponding table may be created from the areas measured on the overlap map. Additionally, data may be obtained on nearby properties such as recent sale prices and images of views seen from those properties. The views from the nearby properties may be captured using the methods similar to those used to capture the image of the view from the selected property. Content, distance, and overlap maps and the tables corresponding to the overlap maps may be created from the images of the nearby properties using the technique described in the system of FIG. 1 and method of FIG. 2, resulting in a learning set of tables with associated sale prices. A statistical method such as regression analysis may be performed between the table corresponding to the selected property and the learning set of tables with associated sale prices to yield an evaluation of the effect of the view on the selected property.

Another application of this invention may be to optimize the scenic value of a new project. The system of FIG. 1 and method of FIG. 2 may be used to enhance computer aided design (CAD) software to calculate the potential values attributable to the potential scenic views for different design options. For example, window and structure orientation and size, as well as landscape planning may affect the potential scenic view from the project and thus affect the potential value of the project. Images of the potential views of different design options may be obtained using any known technique. The images of the potential views may be processed using the method described above, creating content, distance, and overlap maps with corresponding tables. Relevant data such as view images and values may be obtained on existing projects which are similar to the project being planned. Using the method described above, the data may be processed to create a learning set of tables with associated values. A statistical method such as regression analysis may be performed between the tables for the different design options and the learning set of tables to calculate the potential value for each design option. The designers and planners of the project may select a design based on an optimal potential value.

This invention may also be used in a computer-generated virtual world, such as Second Life™, where virtual properties may be evaluated for trade. At least one virtual view of or from a selected virtual property may be obtained using any known technique and may be processed using the system of FIG. 1 and method of FIG. 2 to create content, distance, and overlap maps with a corresponding table. A collection of virtual views and prices from nearby virtual properties may be obtained and processed in a similar way resulting in a learning set of tables with associated prices. A statistical method such as regression analysis may be used between the table corresponding to the selected virtual property and the learning set of tables with associated prices to determine the effect of the virtual view on the value of the virtual property.

Similar to the CAD application described above, the system of FIG. 1 and method of FIG. 2 may be used in the design and creation of new projects in a computer-generated virtual world environment. Images of the potential virtual views of different virtual design options may be obtained using any known technique. The images of the potential views may be processed using the method described above, creating content, distance, and overlap maps with corresponding tables. Virtual images of views from nearby virtual projects with corresponding values may be obtained and similarly processed resulting in a learning set of tables with associated values. A statistical method such as regression analysis may be performed between the tables for the different virtual design options and the learning set of tables with associated values to calculate the potential values of the different design options. The designers and planners may choose the design with the optimal virtual value.

This invention may similarly be applied in environmental impact analysis. A newly planned project may potentially obstruct the view from an existing asset. The method described above to evaluate a view may be used in assessing the damage of the new project to the existing assets. At least one image of the unobstructed view from the existing asset and at least one image of the obstructed view from the existing asset may be obtained using any known technique. The images may be processed and evaluated using the method described above and compared to determine the damage to the existing asset.

Further applications of this invention may be to provide a 'scenic' option to conventional navigation services. A route segment may be evaluated as follows: a stream of images taken from the route segment may be obtained using any known technique. The images may be processed as described above to create content, distance, and overlap maps with corresponding tables. A learning set of images may be obtained with assigned scenic values. The learning set of images may be processed as described above to create a learning set of tables with associated values. A statistical method such as regression analysis may be performed between the tables of the stream of images and the learning set of tables, resulting in a scenic value for each image in the stream. These values may be used to calculate a scenic value for the route segment, for example by computing their average. This method may be repeated to calculate the scenic value for other route segments. The scenic value of a given route may be calculated by summing the scenic values of the route segments included in that route. The navigation service may compare the scenic values for different potential routes and return a route with an optimal 'scenic' value.

It will be appreciated that by evaluating a view using non-subjective parameters such as scenic content, relative distance from the viewer, and historical prices, and by omitting guesswork and other subjective factors, the resulting evaluation reflects the multifaceted properties of scenery in general and is more consistent and objective than an evaluation obtained using traditional view assessment methods.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for evaluating a view, the system comprising:
   a first mapper configured to encode an image of a view according to a first parameter to create a first map comprising a plurality of defined areas;
   a second mapper configured to encode said image according to a second parameter to create a second map comprising a plurality of defined areas;
   an overlap mapper configured to combine said maps to create an overlap map;
   a tabulator configured to measure areas in said overlap map corresponding to overlapping ones of any of said defined areas, thereby creating a set of measurements of said image; and
   an analyzer configured to perform an analysis of said set of measurements of said image and a learning set of measurement groups with associated values to compute on a non-transitory computer-readable medium an estimated value associated with said image wherein said estimated value relates to said set of measurements of said image in the same manner that each value in said learning set relates to its associated measurement group.

2. A system according to claim 1 wherein said first parameter is a type of content in said image.

3. A system according to claim 1 wherein said second parameter is the relative distance of a type of content in said image from the point of view of the observer of said view.

4. A system according to claim 1 wherein said overlap mapper combines said first and second maps by superimposition.

5. A system according to claim 1 wherein said areas in said overlap map are measured in pixels.

6. A system according to claim 1 wherein said analysis is a regression analysis.

7. A system according to claim 1 wherein said computed estimated value associated with said image is used to price a real estate property.

8. A system according to claim 1 wherein said image is generated by computer aided design software.

9. A system according to claim 1 wherein said image is of a view of or from a virtual property in a computer-generated virtual world.

10. A method for evaluating a view, the method comprising:
    encoding an image of a view according to a first parameter to create a first map comprising a plurality of defined areas;
    encoding said image according to a second parameter to create a second map comprising a plurality of defined areas;
    combining said maps to create an overlap map;
    measuring areas in said overlap map corresponding to overlapping ones of any of said defined areas, thereby creating a set of measurements of said image; and
    performing an analysis of said set of measurements of said image and a learning set of measurement groups with associated values, thereby computing an estimated value associated with said image wherein said estimated value relates to said set of measurements of said image in the same manner that each value in said learning set relates to its associated measurement group.

11. A method according to claim 10 wherein said first encoding step comprises encoding wherein said first parameter is a type of content in said image.

12. A method according to claim 10 wherein said second encoding step comprises encoding wherein said second parameter is the relative distance of a type of content in said image from the point of view of the observer of said view.

13. A method according to claim 10 wherein said combining step comprises combining said first and second maps by superimposition.

14. A method according to claim 10 wherein said measuring step comprises measuring areas in said overlap map in pixels.

15. A method according to claim 10 wherein said performing an analysis step comprises performing a regression analysis.

16. A method according to claim 10 wherein said performing an analysis step comprises associating said estimated value with a real estate property.

17. A method according to claim 10 and further comprising performing any of said steps where said image is generated by computer aided design software.

18. A method according to claim 10 and further comprising performing any of said steps where said image is of a view of or from a virtual property in a computer-generated virtual world.

19. A method according to claim 10 and further comprising performing any of said steps for a plurality of images of a plurality of views of or from a plurality of virtual property designs.

20. A method according to claim 19 and further comprising calculating said value for said plurality of images in an environmental impact analysis.

21. A method according to claim 10 and further comprising performing any of said steps for a plurality of images of a plurality of views from a plurality of locations along a route segment.

22. A method according to claim 21 and further comprising summing a plurality of said values calculated for said plurality of images.

23. A method according to claim 21 and further comprising summing a plurality of said values calculated for said plurality of images associated with a plurality of said route segments.

24. A computer program embodied on a non-transitory computer-readable medium, the computer program comprising:
    a first code segment operative to encode an image of a view according to a first parameter to create a first map comprising a plurality of defined areas;
    a second code segment operative to encode said image according to a second parameter to create a second map comprising a plurality of defined areas;
    a third code segment operative to combine said maps to create an overlap map;
    a fourth code segment operative to measure areas in said overlap map corresponding to overlapping ones of any of said defined areas, thereby creating a set of measurements of said image; and
    a fifth code segment operative to perform an analysis of said set of measurements of said image and a learning set of measurement groups with associated values, thereby computing an estimated value associated with said image wherein said estimated value relates to said set of measurements of said image in the same manner that each value in said learning set relates to its associated measurement group.

* * * * *